Sept. 19, 1961 A. S. DOROSZ ET AL 3,000,342

DIP SOLDERING MACHINES

Filed May 11, 1956 18 Sheets-Sheet 1

Inventors
Adolph S. Dorosz
Andrew J. Gilbride
Frank W. Spencer
By their Attorney Sept. 19, 1961 A. S. DOROSZ ET AL 3,000,342

DIP SOLDERING MACHINES

Filed May 11, 1956 18 Sheets-Sheet 2

Inventors
Adolph S. Dorosz
Andrew J. Gilbride
Frank W. Spencer
By their Attorney

DIP SOLDERING MACHINES

Filed May 11, 1956 18 Sheets-Sheet 3

Inventors
Adolph S. Dorosz
Andrew J. Gilbride
Frank W. Spencer
By their Attorney Sept. 19, 1961 A. S. DOROSZ ET AL 3,000,342

DIP SOLDERING MACHINES

Filed May 11, 1956 18 Sheets-Sheet 4

Inventors
Adolph S. Dorosz
Andrew J. Gilbride
Frank W. Spencer
By their Attorney Sept. 19, 1961 A. S. DOROSZ ET AL 3,000,342

DIP SOLDERING MACHINES

Filed May 11, 1956 18 Sheets-Sheet 5

Inventors
Adolph S. Dorosz
Andrew J. Gilbride
Frank W. Spencer
By their Attorney

DIP SOLDERING MACHINES

Filed May 11, 1956 18 Sheets-Sheet 6

Inventors
Adolph S. Dorosz
Andrew J. Gilbride
Frank W. Spencer
By their Attorney Inventors
Adolph S. Dorosz
Andrew J. Gilbride
Frank W. Spencer
By their Attorney

DIP SOLDERING MACHINES

Filed May 11, 1956

18 Sheets-Sheet 8

Inventors
Adolph S. Dorosz
Andrew J. Gilbride
Frank W. Spencer
By their Attorney

*Inventors*
Adolph S. Dorosz
Andrew J. Gilbride
Frank W. Spencer
By their Attorney Sept. 19, 1961 A. S. DOROSZ ET AL 3,000,342

DIP SOLDERING MACHINES

Filed May 11, 1956 18 Sheets-Sheet 10

Inventors
Adolph S. Dorosz
Andrew J. Gilbride
Frank W. Spencer
By their Attorney Inventors
Adolph S. Dorosz
Andrew J. Gilbride
Frank W. Spencer
By their Attorney Inventors
Adolph S. Dorosz
Andrew J. Gilbride
Frank W. Spencer
By their Attorney

DIP SOLDERING MACHINES

Filed May 11, 1956

Inventors
Adolph S. Dorosz
Andrew J. Gilbride
Frank W. Spencer
By their Attorney Sept. 19, 1961 A. S. DOROSZ ET AL 3,000,342

DIP SOLDERING MACHINES

Filed May 11, 1956 18 Sheets-Sheet 14

Inventors
Adolph S. Dorosz
Andrew J. Gilbride
Frank W. Spencer
By their Attorney Inventors
Adolph S. Dorosz
Andrew J. Gilbride
Frank W. Spencer
By their ~~Attorney~~

*Inventors*
Adolph S. Dorosz
Andrew J. Gilbride
Frank W. Spencer
By their Attorney Sept. 19, 1961

A. S. DOROSZ ET AL 3,000,342

DIP SOLDERING MACHINES

Filed May 11, 1956

18 Sheets-Sheet 17

Inventors
Adolph S. Dorosz
Andrew J. Gilbride
Frank W. Spencer
By their Attorney Inventors
Adolph S. Dorosz
Andrew J. Gilbride
Frank W. Spencer
By their Attorney United States Patent Office 3,000,342
Patented Sept. 19, 1961

3,000,342
DIP SOLDERING MACHINES

Adolph S. Dorosz, Beverly, Andrew J. Gilbride, Swampscott, and Frank W. Spencer, Beverly, Mass., assignors to United Shoe Machinery Corporation, Flemington, N.J., a corporation of New Jersey Filed May 11, 1956, Ser. No. 584,361
2 Claims. (Cl. 113—129)

This invention relates to the provision of versatile apparatus for simultaneously and uniformly forming a plurality of good quality joints by means of dip soldering. More particularly, and as herein illustrated, the invention pertains to a conveyorized type of machine for sequentially carrying wiring boards through a closed series of treating stations which are specially adapted and automatically controlled to yield uniformly good results in uniting the circuits on the boards with the leads of their respective components. Although shown herein as applied to the dip soldering of printed wiring boards which are caused to carry the leads of their components into and through solder in a vat, it will be appreciated that the invention is not thus limited in use, but may in its various aspects be advantageously employed for the soldering of other equipment, and indeed for coating or otherwise treating different articles in a variety of ways.

Chassis for mounting electronic components are increasingly taking the form of so-called printed wiring boards, i.e., insulating bases commonly of laminated plastic upon which a specified conductive pattern, usually of copper, has been reproduced. These boards vary considerably in size and shape to accommodate different circuit configurations, and will normally be preformed to receive in appropriate relative positions the terminations of a plurality of components to be interconnected. A great advantage derived from mounting the bodies of the required components on one side of a printed wiring board and inserting their leads through the board for joining with the circuit on the other side of the board is that all the lead or termination ends may then lie substantially in a plane and hence be simultaneously and permanently connected into the circuit by one dip soldering operation. Many techniques, both manual and automatic, have been practiced to obtain dip soldered joints, and the importance of such interdependent factors as solder and flux content, temperatures, and speed of movement and time control is generally appreciated. With the advent of automatic systems for assembling components on wiring boards it has become particularly desirable that an improved type of high output dip soldering machine capable of insuring reliable, uniform joints be provided, and accordingly this is the general object of the present invention.

In keeping with the object just stated, a feature of the invention resides in the provision in a dip soldering machine of an endless chain arranged for travel over a series of treating stations, track means by which spaced work-mounting carriages are sequentially guided for treatment of their work at the successive stations, and means by which each carriage is connected to the chain to be moved to and through the stations, corresponding portions of the paths of the chain and track means deviating in direction from each other as one of the stations is being traversed by a carriage to modify its speed with respect thereto. As herein shown, the several stations, as arranged in order of operation, are: (1) loading, (2) fluxing, (3) pre-heating, (4) dip soldering, (5) cleaning bath, (6) draining and air cleaning, and (7) unloading. In accordance with a further feature of the invention these stations are advantageously disposed in a generally horizontal and elongated, closed path, such that loading and unloading stations are adjacent to each other and located in a straight reach remote from that of the dip soldering station, while the pre-heating and cleaning bath stations respectively occupy oppositely disposed circular portions of the closed path connecting said straight reaches.

The above and other features of the invention, including for instance a unique carriage for carrying the work pieces, an automatic solder replenishment mechanism, and a solvent bath including brushing means mounted to compensate for wear, together with various novel details of construction and combinations of parts, all contributing to improved performance and output of the stations and of the versatility of the machine as a whole, will now be more particularly described in connection with an illustrative embodiment and with reference to the accompanying drawings thereof in which.

Figures 15, 16, 17, 18, 19:
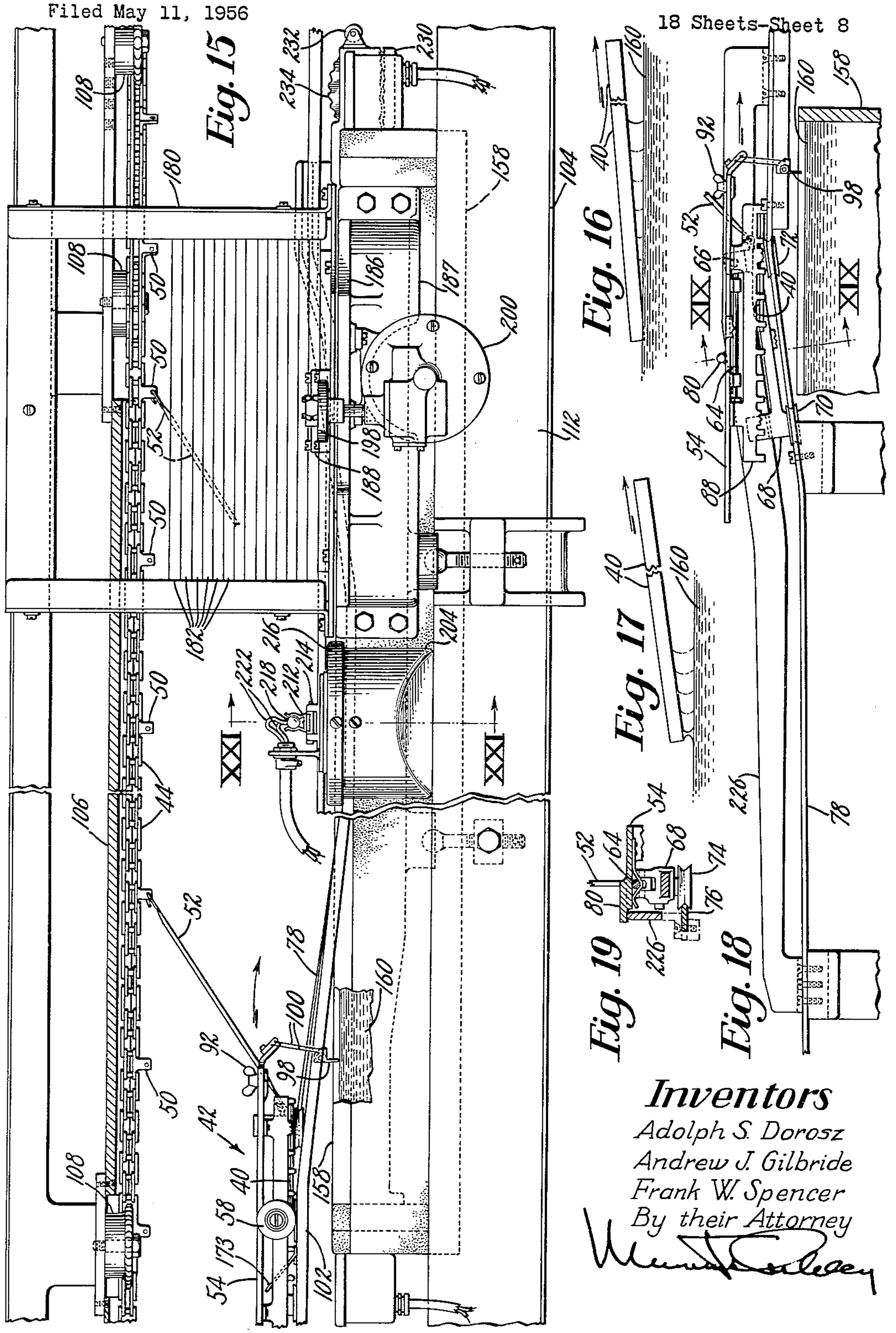
FIG. 15 is a side elevation of a dip soldering station, an intermediate portion thereof being broken away.
Figures 20, 21:
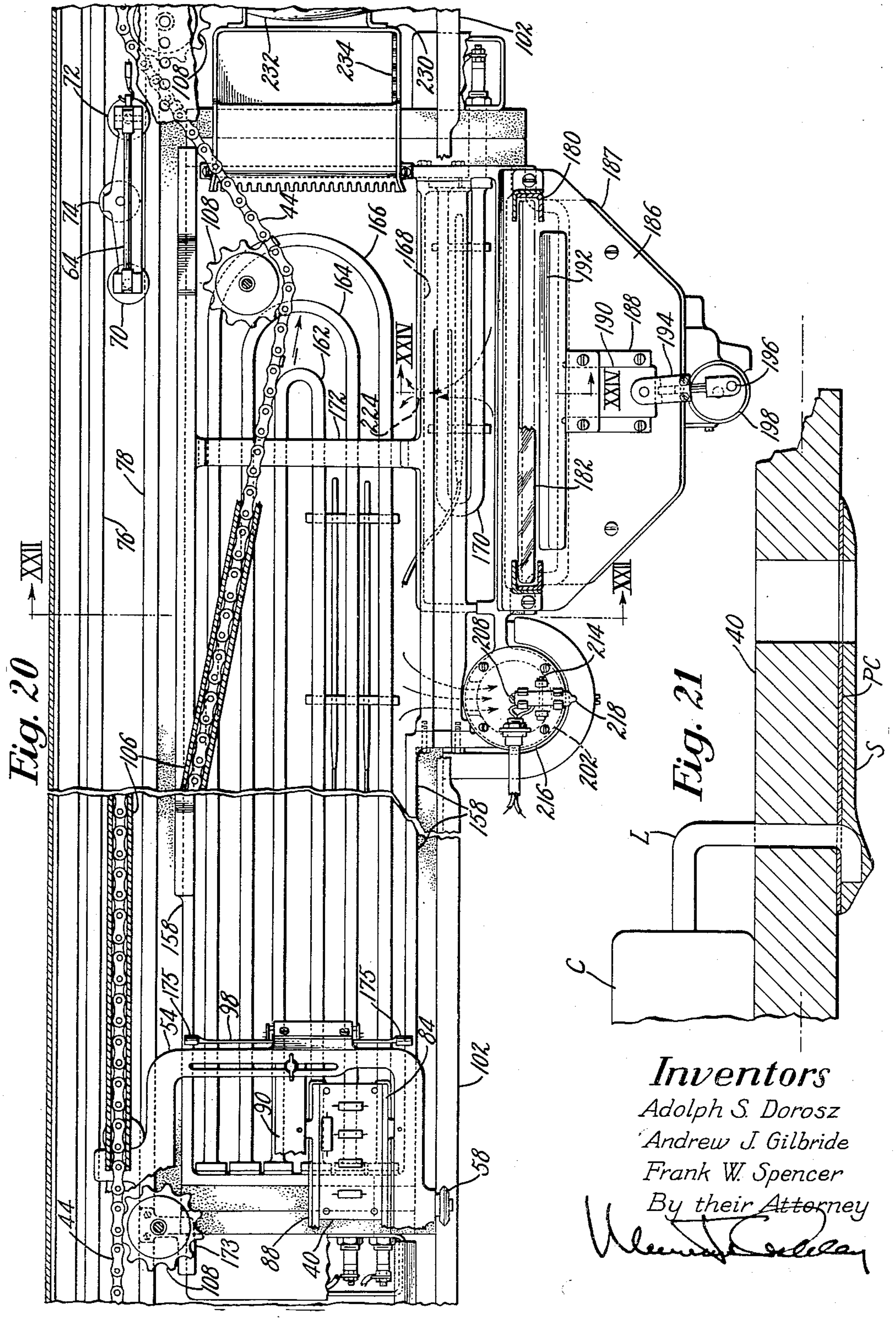
Figures 22, 23, 24:
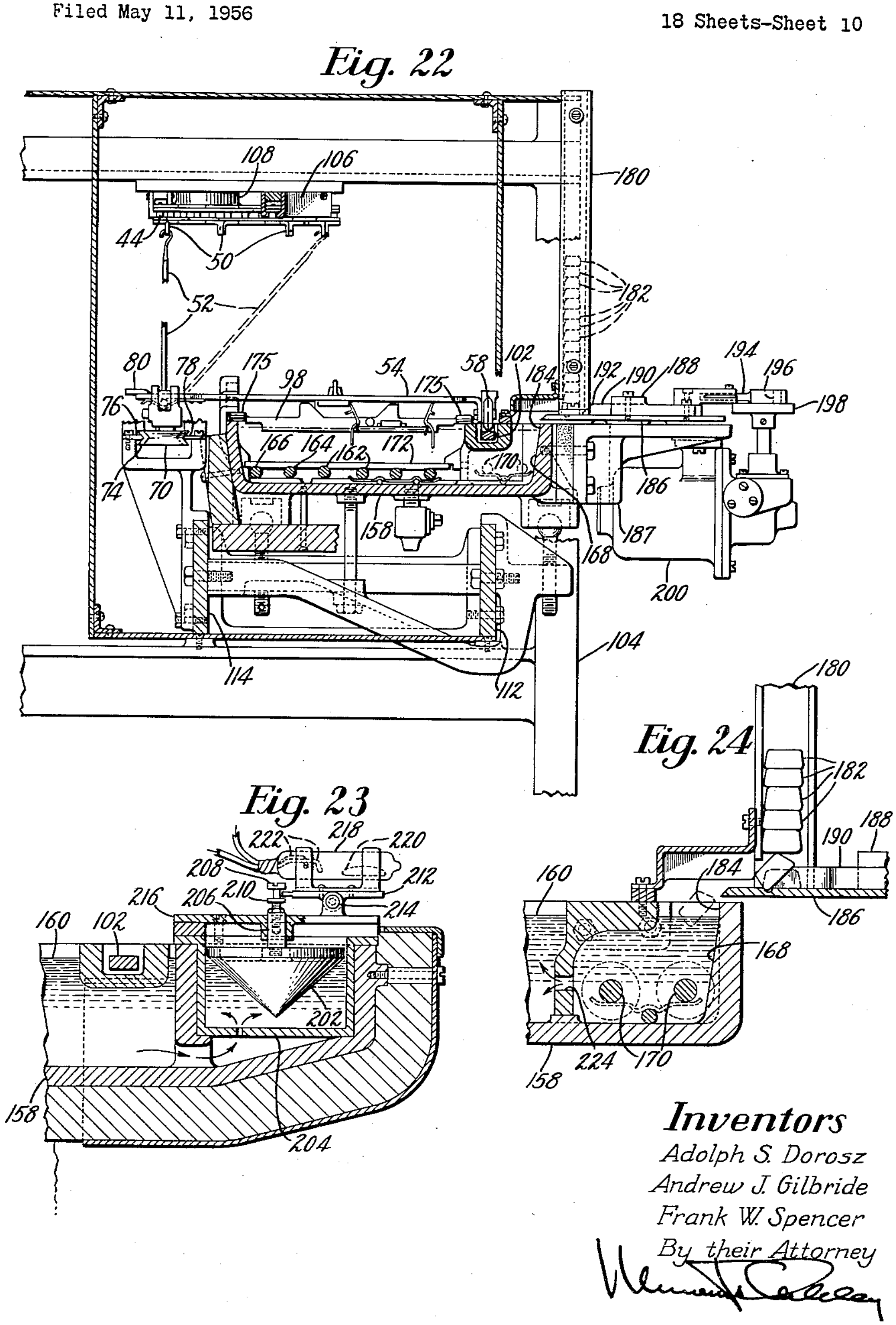

FIGS. 16 and 17 indicate successive positions of a wiring board emerging from solder and showing progressive positions of menisci resulting from the relative movement;

FIG. 18 is a longitudinal, vertical section showing a carriage ascending from one end of the solder tank;

FIG. 19 is a section taken on the line XIX—XIX of FIG. 18 and indicating optional details of construction when insuring that an ascending carriage is to maintain its wiring board in horizontal rather than inclined position;

FIG. 20 is a plan view of the soldering station and indicating solder replenishing means;

FIG. 21 is an enlarged section showing a component lead as inserted in a wiring board, a printed circuit thereon, and the solder of a solidified joint connecting the lead end and printed circuit;

FIG. 22 is a section taken on the line XXII—XXII of FIG. 20;

FIG. 23 is a vertical section showing means indicated in FIG. 20 for adjustably controlling the level of the solder;

FIG. 24 is a vertical section taken on the line XXIV—

Figure 25:
Figures 26, 27, 28:
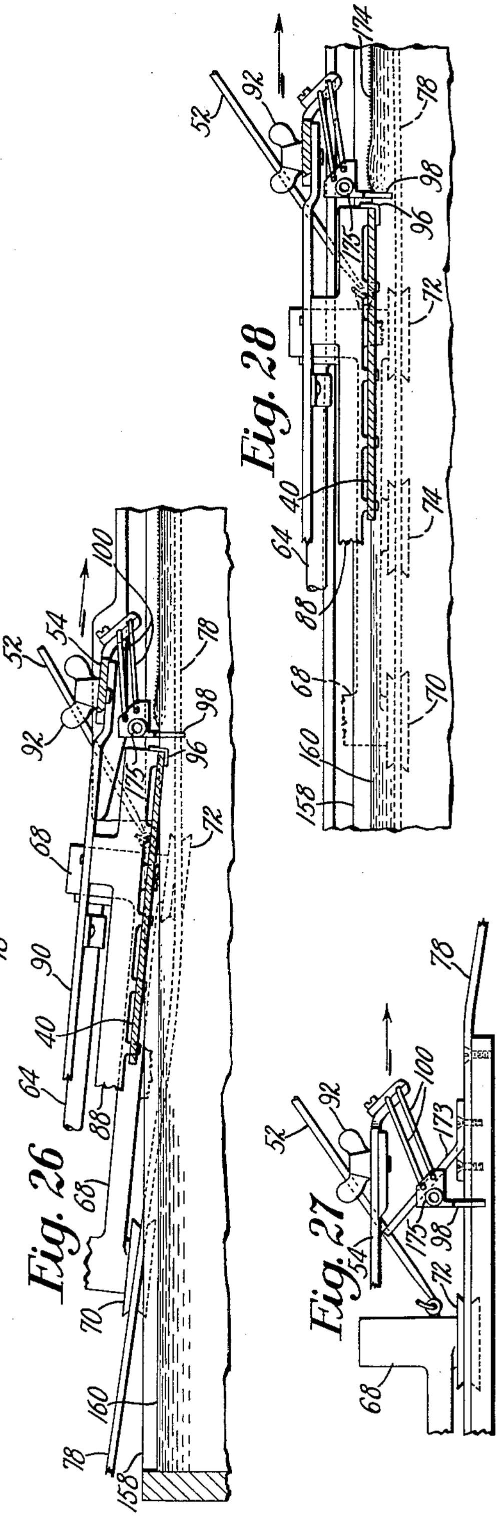
Figure 29:
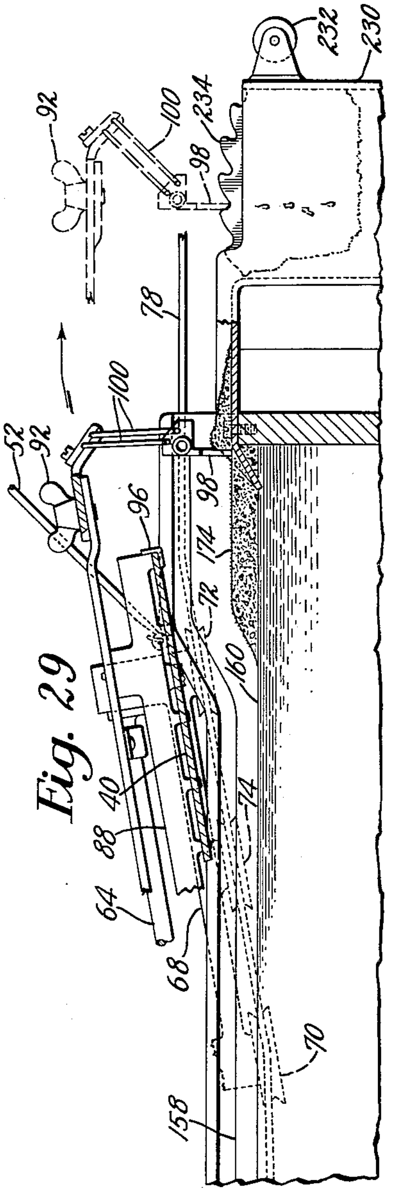
Figure 30:
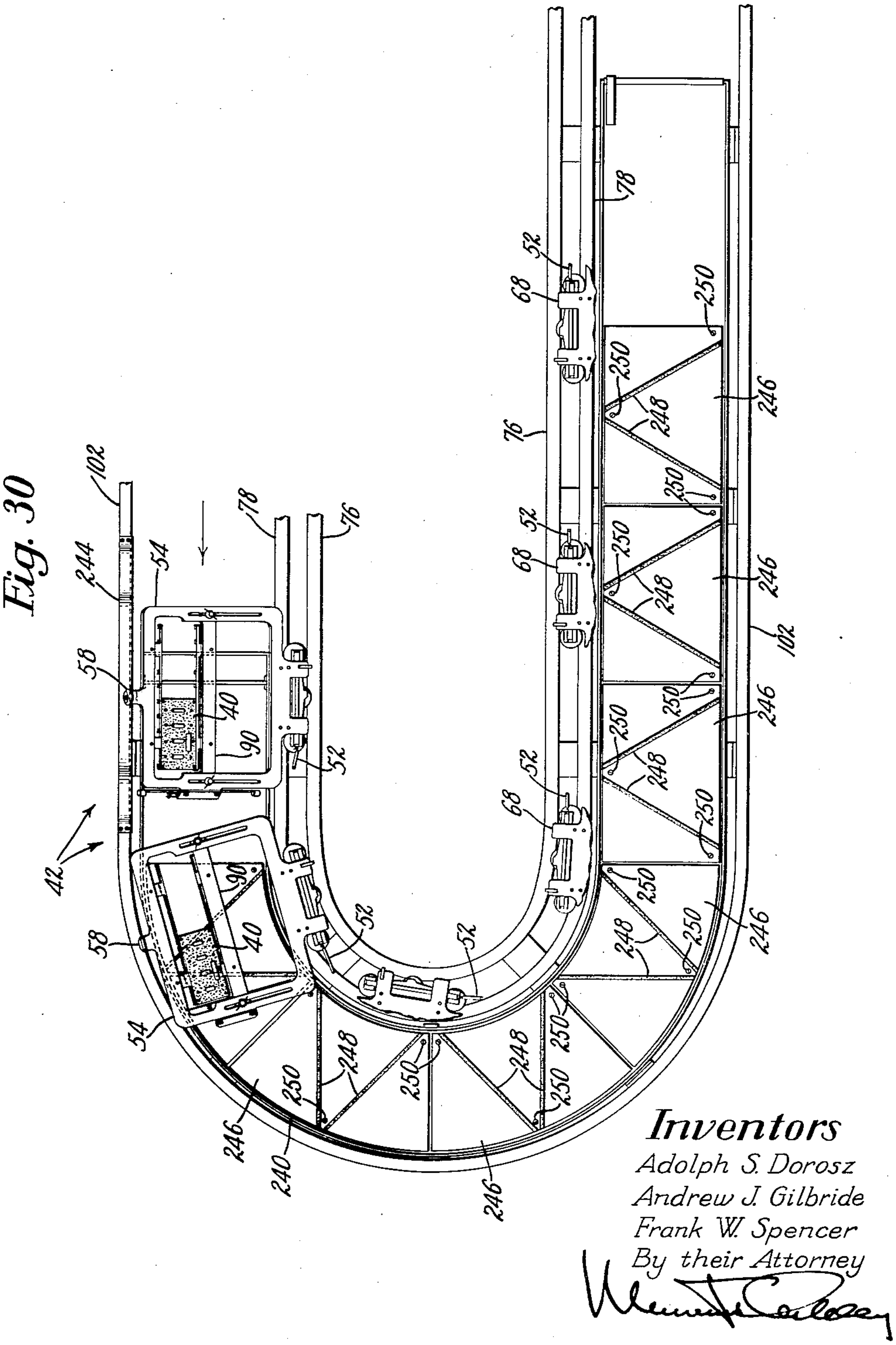
Figure 31:
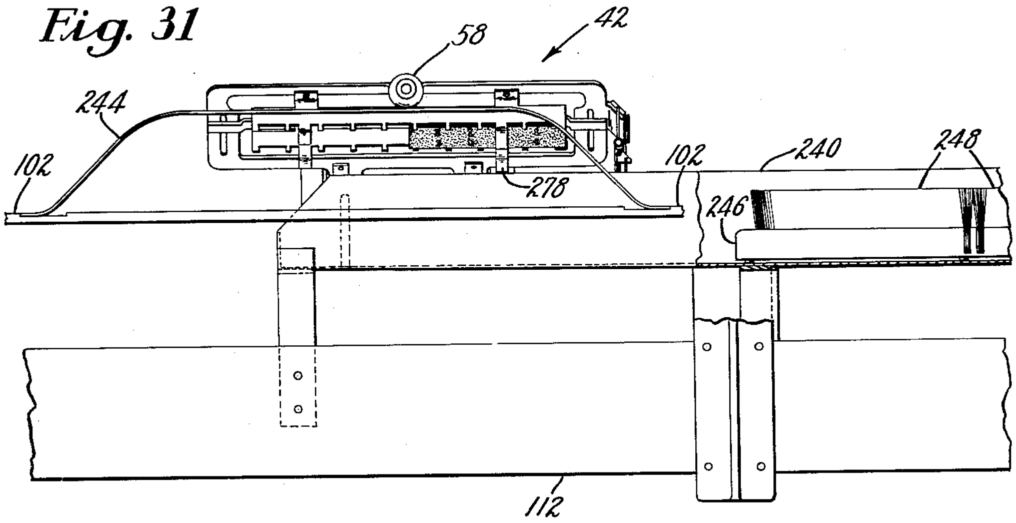
Figure 32:
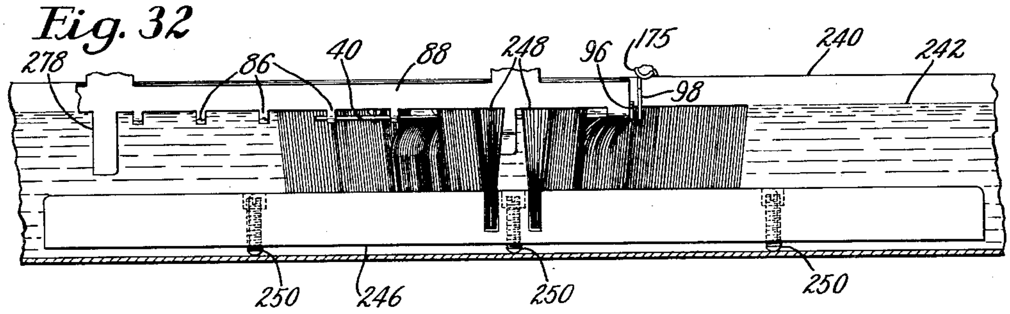
Figure 35:
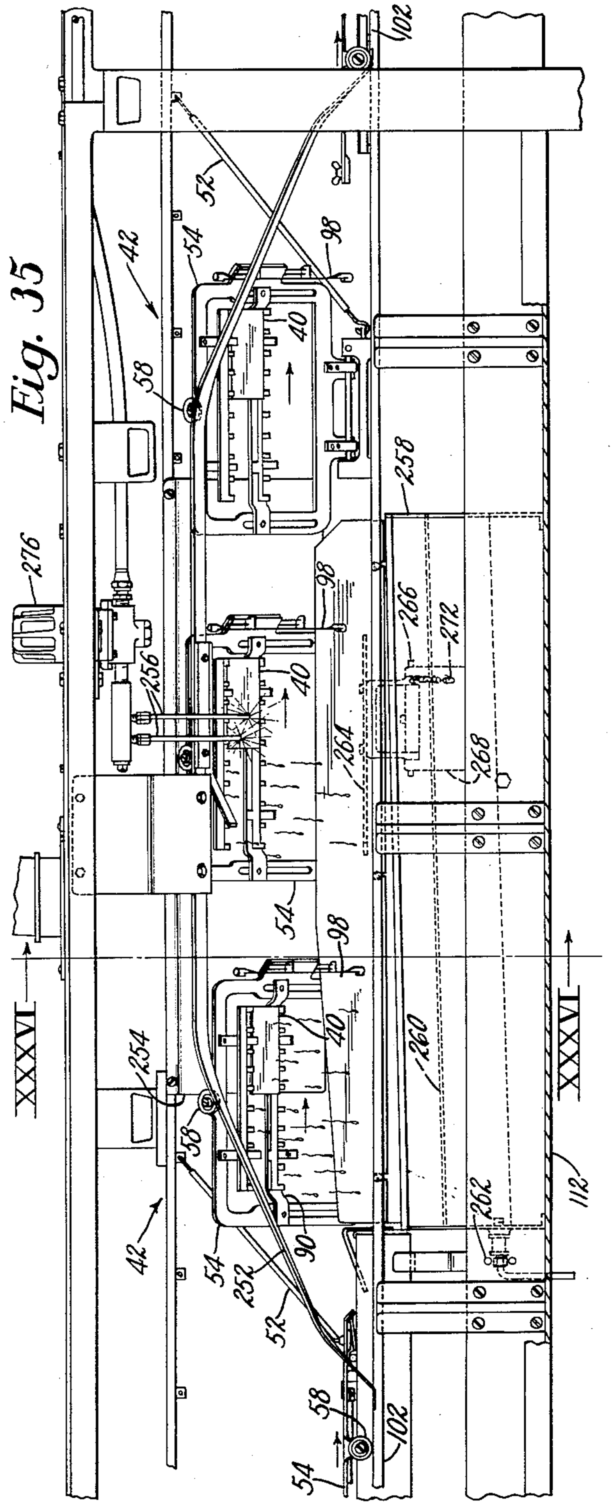
Figure 34:
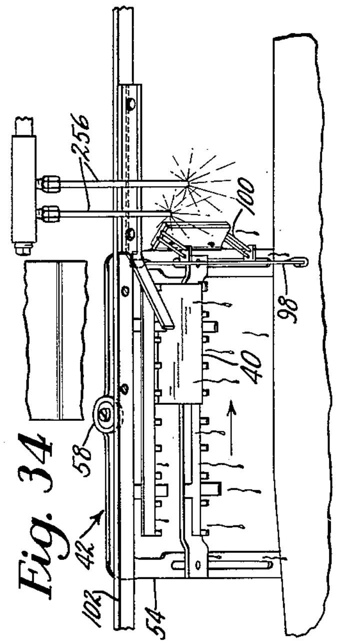
Figure 33:
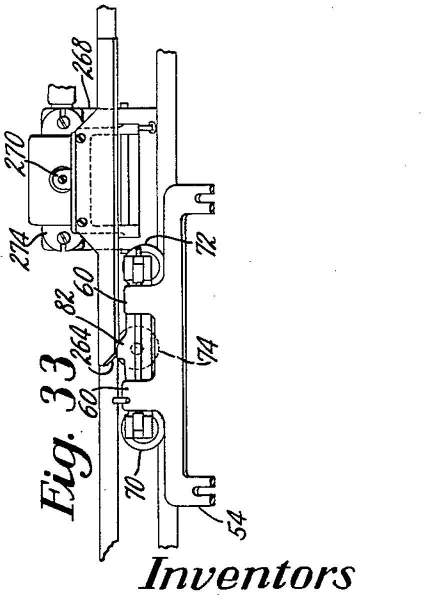
Figure 36:
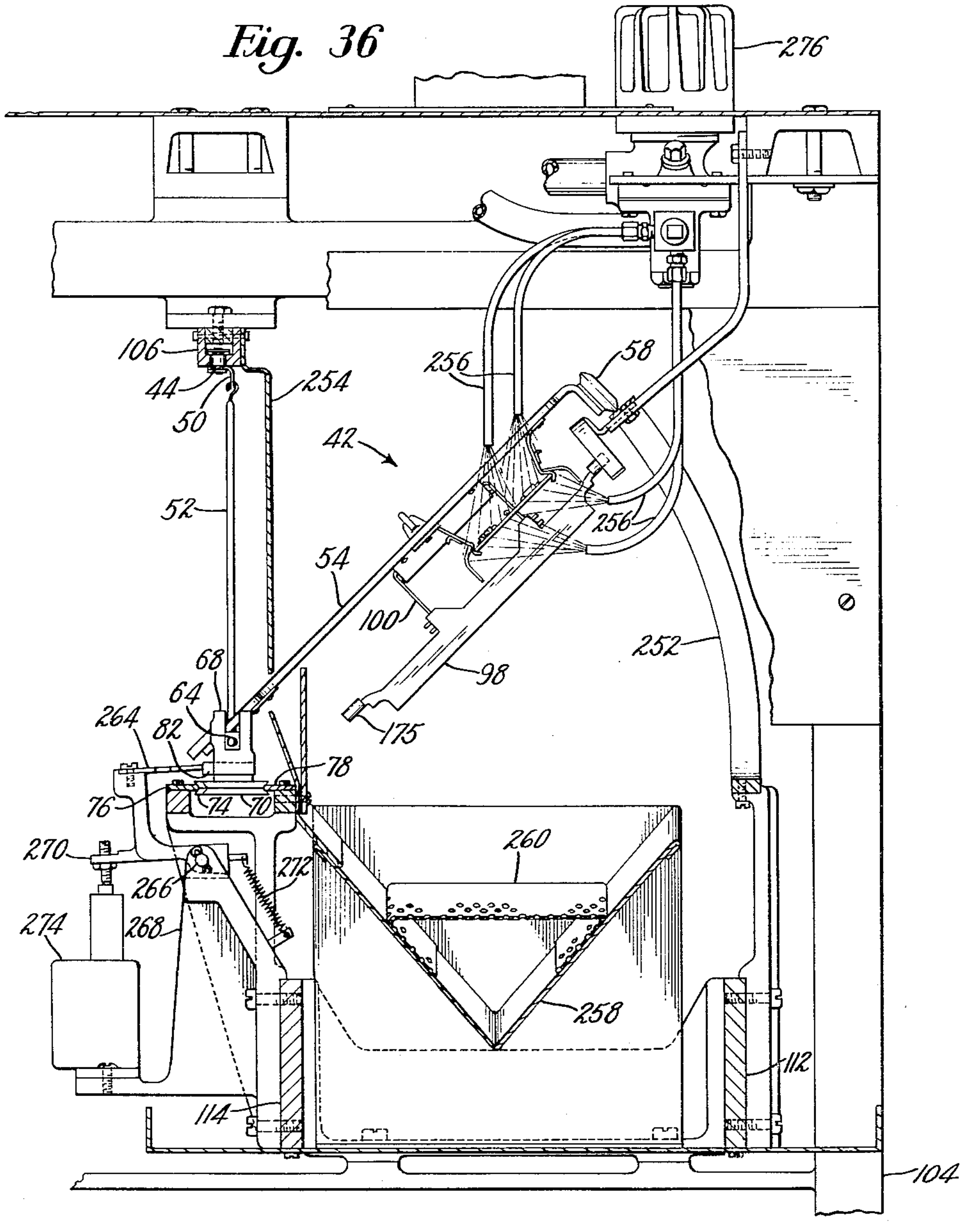

XXIV in FIG. 20 indicating details of the solder replenishing means;

FIG. 25 is a view in side elevation of the inner tracks controlling the carriages traversing the solder tank;

FIG. 26 is a side elevation and partly in section showing a carriage as its wiring board is entering the solder;

FIG. 27 is a detail in side elevation indicating the mounting of a wiper on a carriage and cam means by which the wiper is urged into the solder;

FIG. 28 is a side elevation of the carriage proceeding through the solder;

FIG. 29 is a view corresponding to FIG. 28, but showing the carriage rising from the solder and indicating means by which dross is removed and collected;

FIG. 30 is a plan view of a cleaning bath and its brushes;

FIG. 31 is a view in side elevation of means for guiding successive carriages into the cleaning bath of FIG. 30;

FIG. 32 is a vertical section through a portion of the cleaning bath and illustrating brush action on a wiring board;

FIG. 33 is a plan view of a portion of a carriage about to actuate air cleaning devices;

FIG. 34 is an elevation indicating a tilted carriage traversing a portion of the draining and air-cleaning station;

FIG. 35 is an elevation, partly in section, of the draining and air cleaning station;

FIG. 36 is a section taken on the line XXXVI—XXXVI on FIG. 35.

Figure 37:
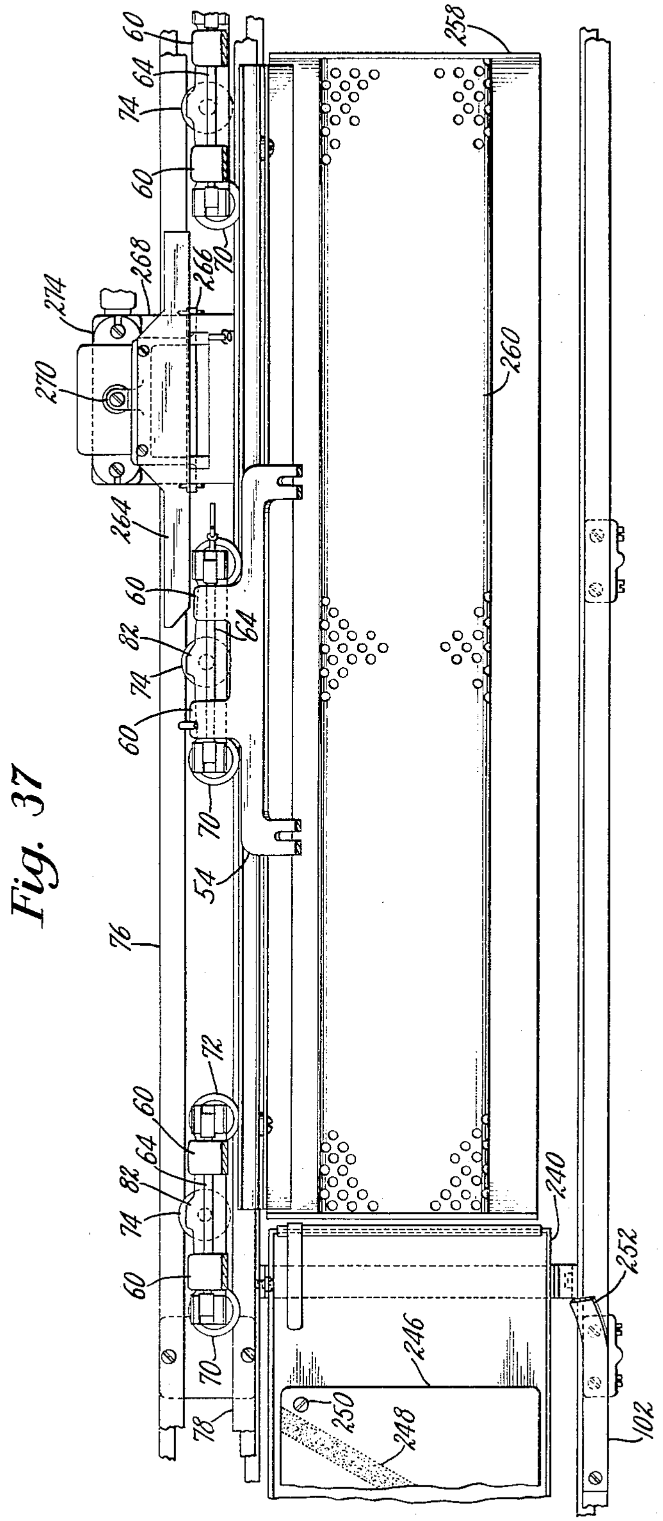
Figure 38:
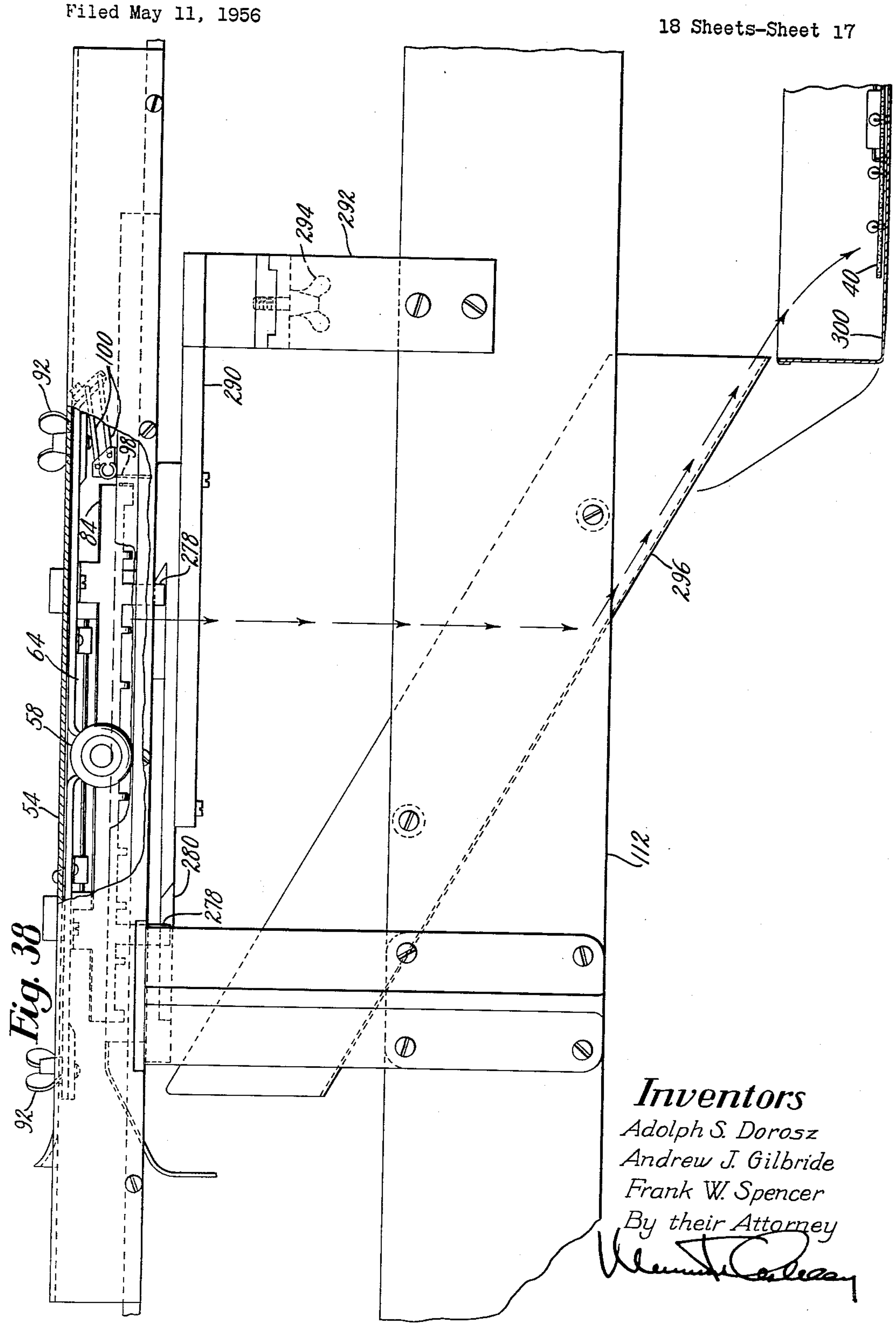
Figure 39:
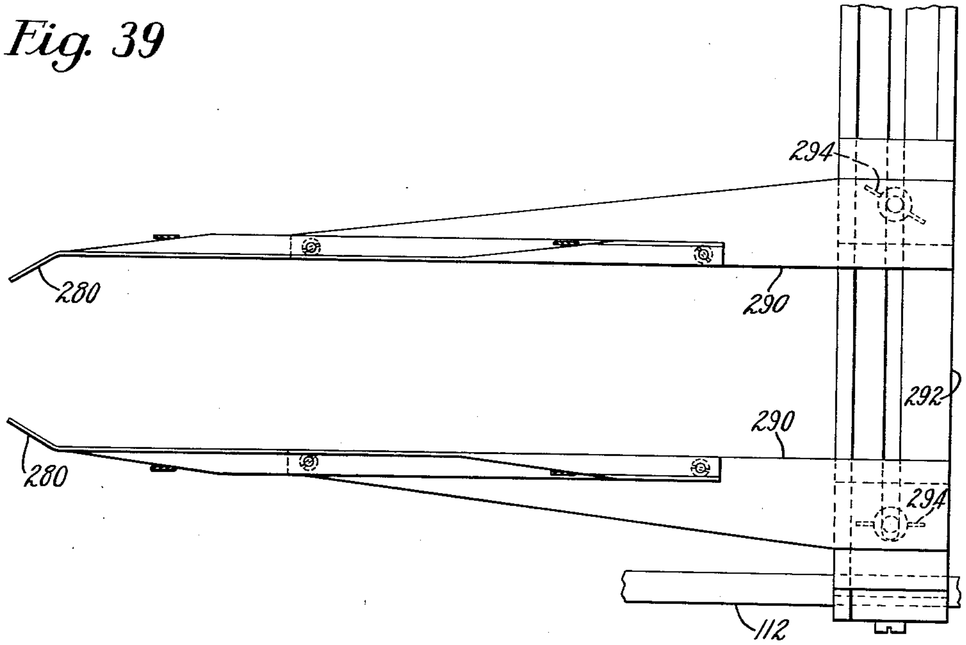
Figure 40:
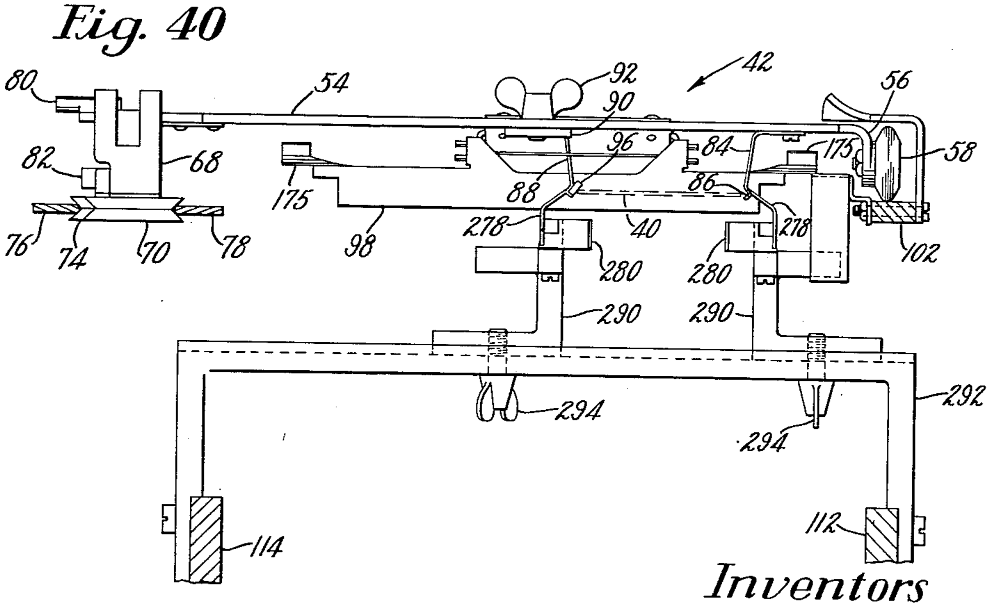

FIG. 37 is a plan view of a portion of the station shown in FIG. 35, portions being broken away for clarity;

FIG. 38 is an elevation with portions broken away of the unloading station;

FIG. 39 is a plan view of unloading fingers mounted in the unloading station; and FIG. 40 is a vertical section indicating a carriage being relieved of its wiring board.

Figure 1:
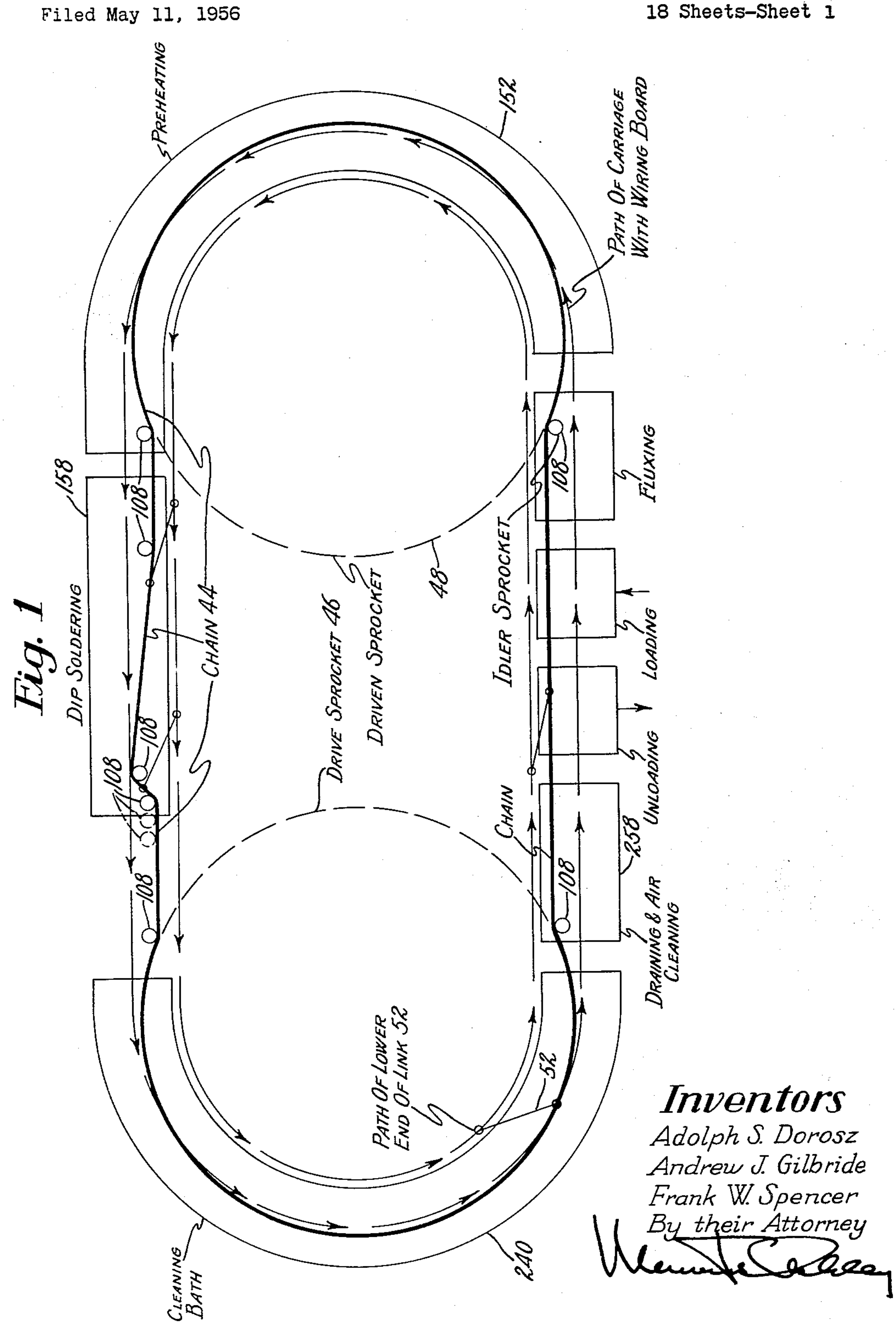
FIG. 1 is a schematic plan view of an exemplary automatic dip soldering machine, the path of work holding carriages through the operating stations being indicated by arrows.
Figure 2:
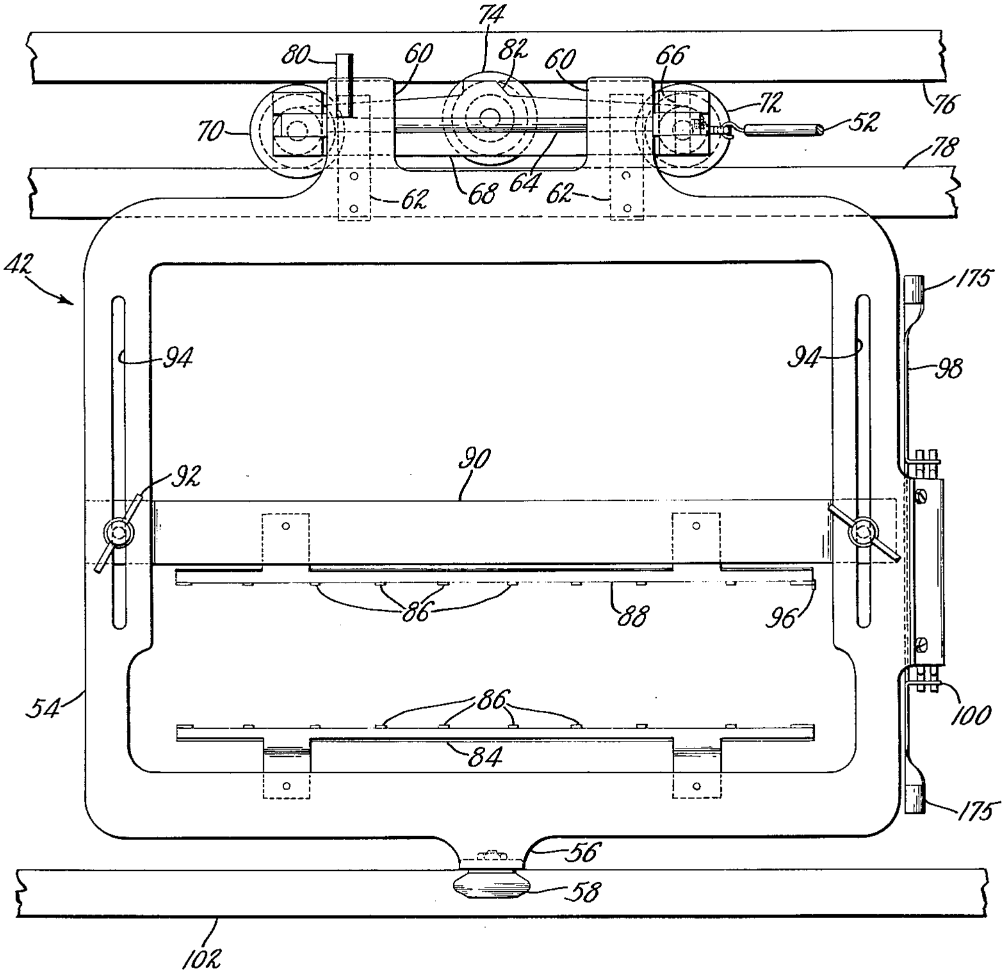
FIG. 2 is a plan view of a detachable carriage and its guide rails.
Figure 3:
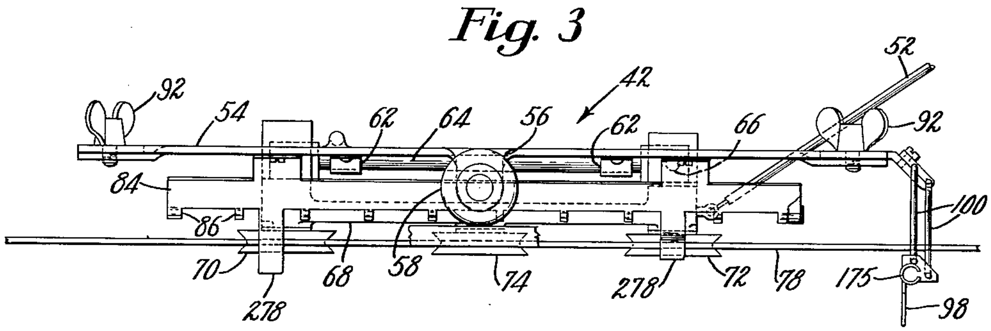
FIG. 3 is a view in side elevation of the carriage shown in FIG. 2.
Figure 4:
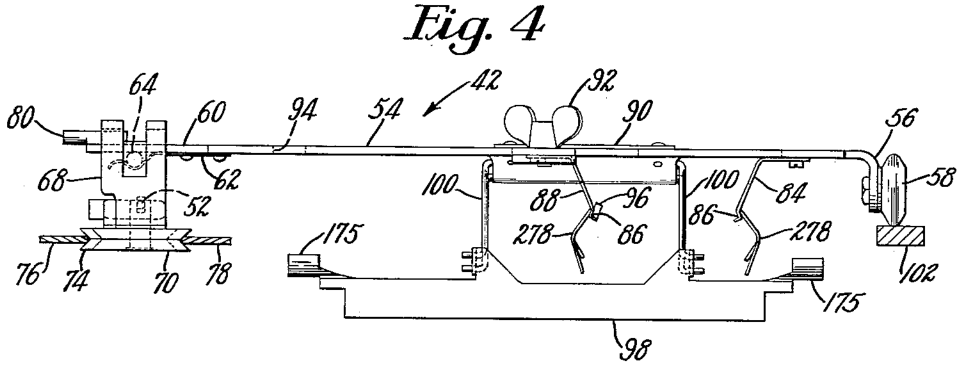
FIG. 4 is a view in end elevation of the carriage shown in FIGS. 2 and 3.

The illustrative machine includes various fire prevention and safety devices, vapor removing means, and precautionary mechanisms which, for the most part, have been omitted from the drawings since they are not necessary to an understanding of this invention and would tend to obscure structure hereinafter to be described. The general arrangement of the machine is indicated in FIG. 1, the several treating stations to be explained in order of their operation being designated as follows: (1) loading, (2) fluxing, (3) pre-heating, (4) dip soldering, (5) cleaning bath, (6) draining and air cleaning, and (7) unloading. For moving wiring boards 40 (FIGS. 6, 10, 13, and 21) sequentially through these stations, each board to be dip soldered is mounted at the loading station in a work-supporting carriage 42 (FIGS. 2, 3, and 4). An endless roller chain 44 (FIGS. 1, 9, 15, and 22) is in mesh with a drive sprocket 46 and an idler sprocket 48 spaced horizontally therefrom, and the carriages 42 are respectively connected to spaced lugs 50 formed on the chain 44 by inclined tow links 52. Control of a motor (not shown) for driving the chain 44 will normally be exercised from the vicinity of the loading station.

*The work-supporting carriage*

Each carriage 42 comprises an open rectangular frame 54 (FIG. 2) having at its outer side a downturned portion 56 for carrying a vertical wheel or roller 58, and at its inner side a pair of inwardly extending projections overlying a pair of spring clips 62, respectively. The latter enable the work-supporting portion of the carriage 42 to be detachably and pivotally connected to a rod 64 of a three-wheeled dolly of the carriage. The rod 64 is pivotally supported at its front end on a pin 66 (FIGS. 2 and 3) carried by one end of a frame 68 of the dolly, the rear end of the rod 64 normally extending into a rectangular slot formed in the rear end of the frame 68. Bosses formed beneath both the rear and front ends of the frame 68 and also at its mid-portion are vertically bored to receive pins on which are respectively mounted for rotation grooved wheels 70, 72, and 74. To provide a three-point bearing arrangement for exercising directional control of the frame 54, the middle wheel 74 is located somewhat more inwardly to engage its track 76, whereas the wheels 70, 72 are disposed to engage a track 78 parallel to the track 76. The front end of the frame 68 is connected to the lower end of a tow link 52. For reasons later mentioned the rearward projection 60 of a carriage may optionally be provided with a still further inwardly projecting arm 80, and an actuating cam 82 (FIG. 2) is formed on the frame 68.

Figure 7:
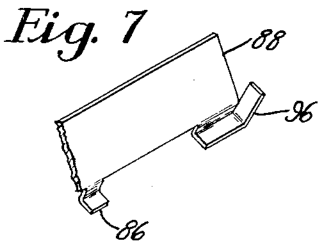
FIG. 7 is a perspective view of the positioning end of a board-holding finger.

The frame 54 has secured to one margin a board-supporting resilient arm 84 provided with spaced, V-shaped depending fingers 86. For cooperating with the arm 84 detachably to suspend a wiring board 40 by its opposite marginal edge faces, a resilient arm 88, also provided with V-shaped fingers 86, is secured to a bar 90 having its ends respectively and adjustably secured to the frame 54. Clamping nuts 92 are accordingly disposed to receive studs respectively formed on opposite ends of the bar 90 and extending through widthwise slots 94 respectively formed in the frame 54. While the straight arms 84 and 88, which preferably are of stainless steel, will accommodate various sizes of rectangular boards, it will be understood that other shapes of arms are provided if required to accommodate non-rectangular boards. As indicated in FIG. 7, the forward end of the arm 88 is provided with a stop 96 against which it is usually desirable to position the leading edge of each board to be dip soldered. As an empty carriage 42 arrives from the unloading station, an operator at the loading station will present a wiring board thereto, component side up, and gently thrust the board downwardly to spread the arms 84, 88 until its opposite edges are received in the fingers 86. By positioning the leading edge of the board against the stop 96, the operator insures that during the soldering operation said leading edge will advantageously be closely adjacent to a widthwise wiper blade 98 (FIGS. 2, 3, and 26), preferably of stainless steel, which is swingably suspended from parallel wire linkage 100. The latter is pivotally secured to a forwardly projecting margin on the carriage. The loaded carriage 42 is now ready to be conveyed by the chain 44 over an elongated, closed path defined by the tracks 76, 78 and a flat outside track 102 cooperative with the roller 58, the path next extending through a fluxing station.

*Fluxing station*

Figure 8:
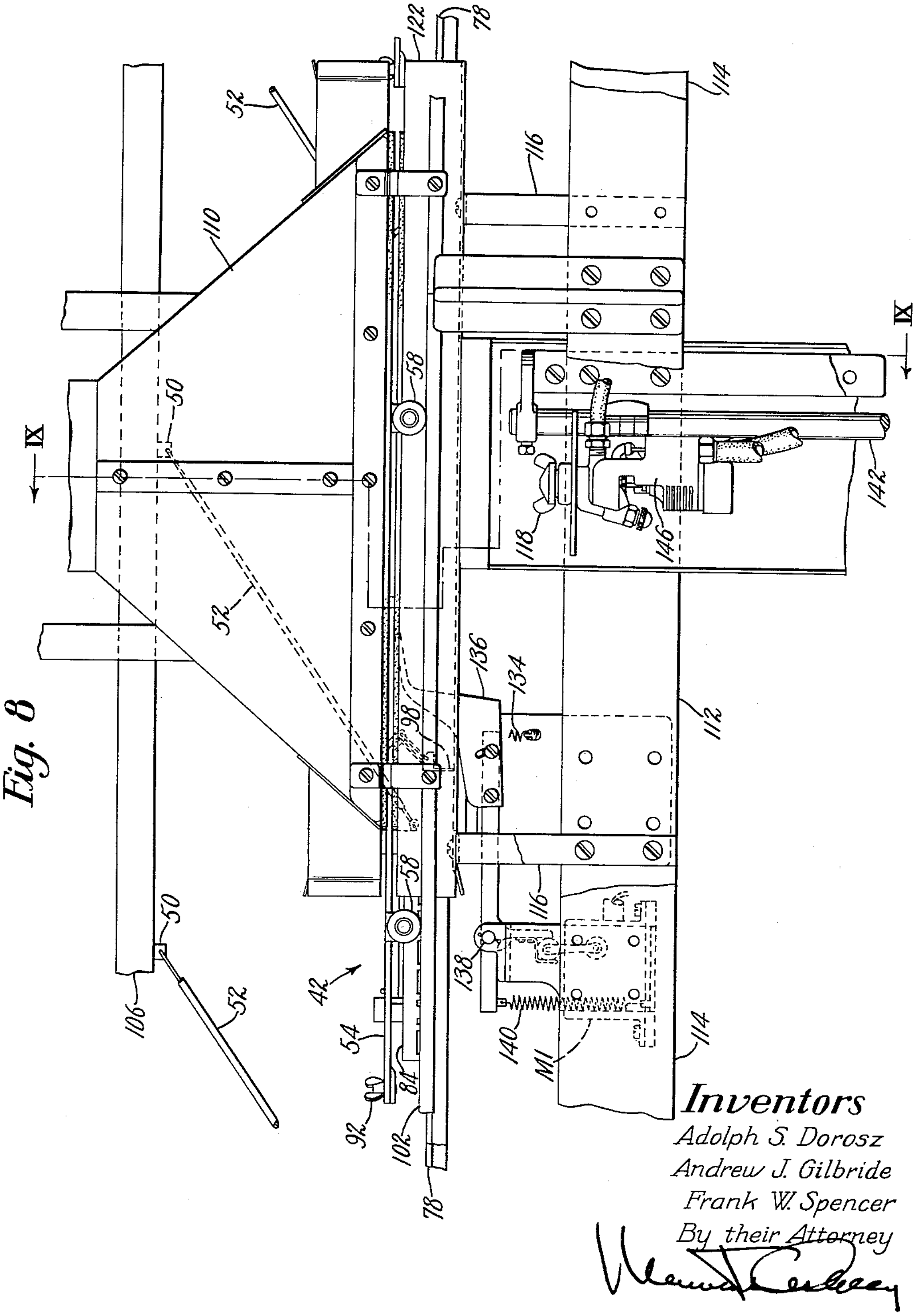
FIG. 8 is a view in side elevation of a flux-spraying station.
Figure 9:
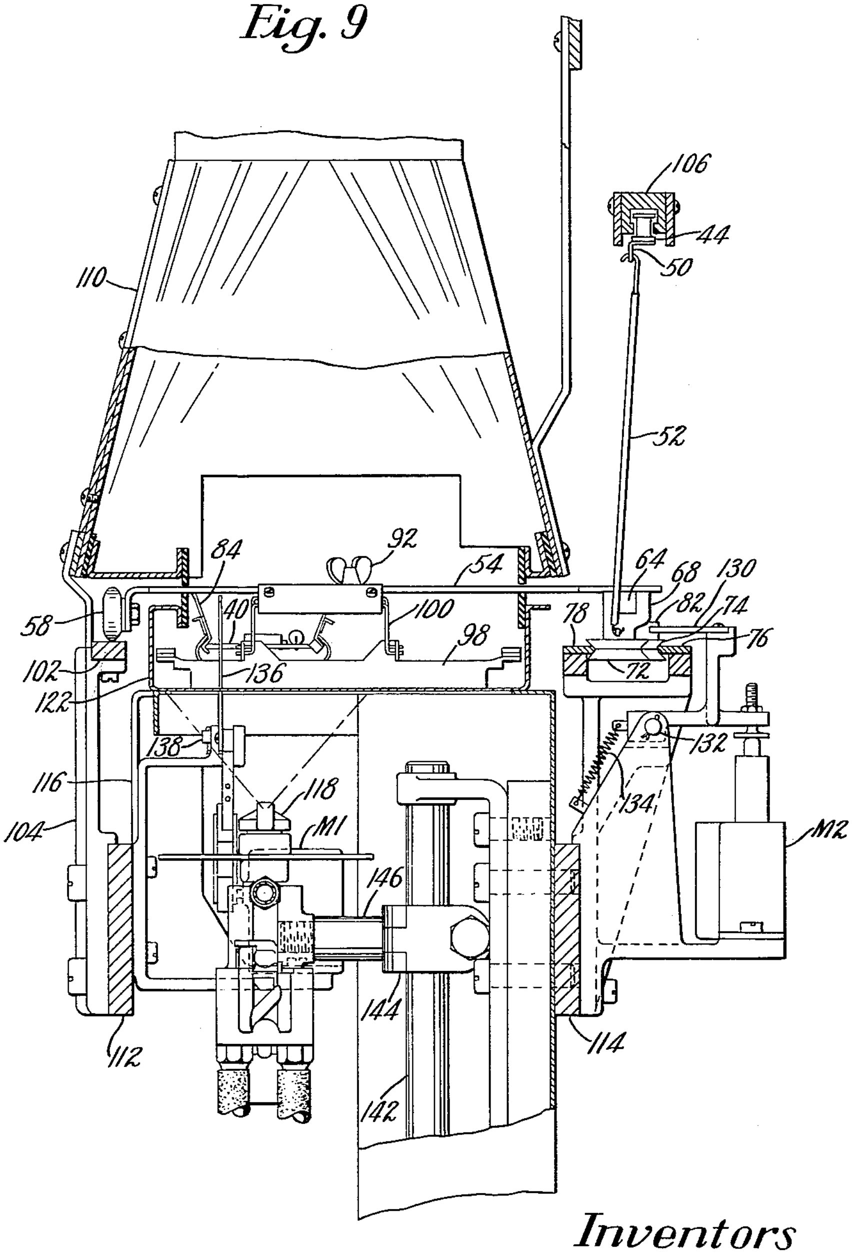
FIG. 9 is a section taken on the line IX—IX of FIG. 8.
Figure 10:
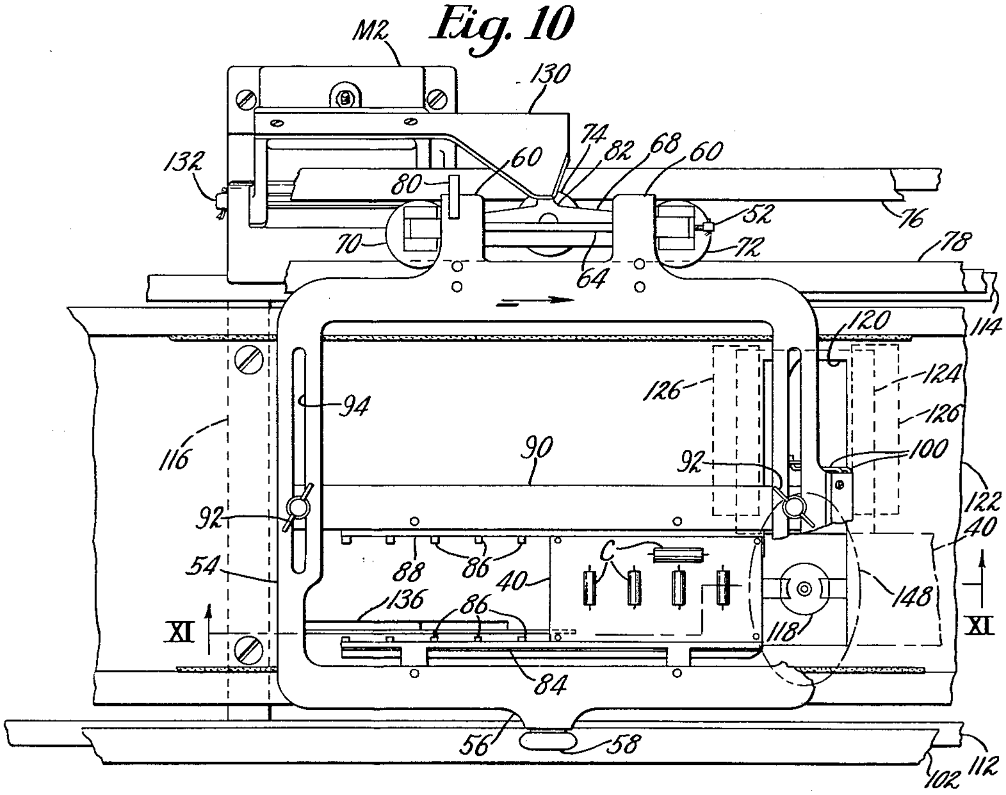
FIG. 10 is a plan view of a carriage having a wiring board about to traverse the flux-spraying zone.

This and other stations of the machine are supported in closed formation at about waist height by a sectionalized main frame generally designated 104 (FIGS. 9, 15, and 22) which also serves to support the sprockets 46, 48, slotted roller chain guide rails 106, and various idler sprockets 108, by which the path of the roller chain 44 is defined, and the carriage tracks 76, 78, and 102. FIG. 8 shows a carriage 42 about to enter and actuate the fluxing station over which an exhaust hood 110 is mounted to eliminate vapor and any flux spray that does not get applied to a wiring board. Spaced horizontal and parallel bars 112, 114 constitute a part of the frame 104 extending around the machine and, in addition to supporting the carriage tracks, serve to mount equipment of the different stations. Thus, as shown in FIG. 9, a housing 116 for a spray gun 118 is secured to the bars 112, 114, and has a rectangular opening 120 (FIG. 10) in its upper surface through at least a portion of which the spray is emitted. Mounted on the housing 116 and brackets projecting from the bars 112, 114, respectively, is a channel-shaped enclosure 122 through which successive carriages 42 pass, the lower and preferably flexible portions of the hood 110 and the upper and preferably flexible portions of the enclosure 122 nearly engaging the carriage frames 54 to prevent leakage of the flux. For masking off an appropriate widthwise potion of the opening 120 a piece of sheet material 124

Figure 11:
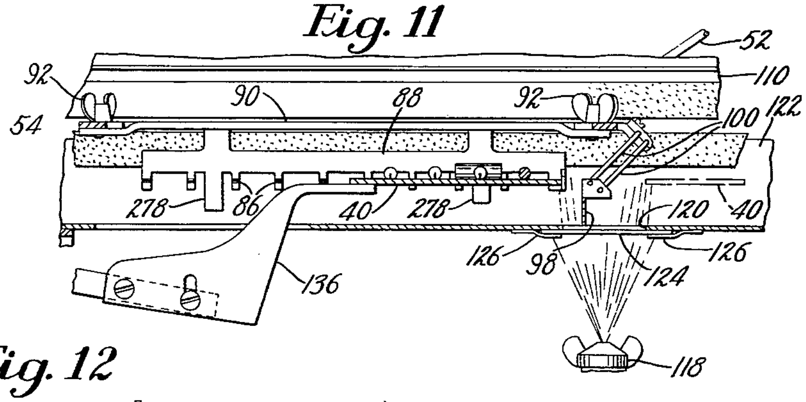
FIG. 11 is a section taken on the line XI—XI of FIG. 10.
Figure 12:
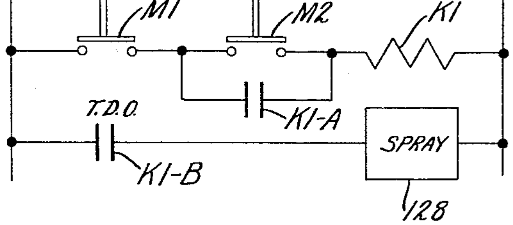
FIG. 12 is a wiring diagram indicating the electrical control of the fluxing spray.

(FIGS. 10 and 11) is secured by tapes 126 to the housing 116. The gun 118 is of a commercially available type and is connected by hose to suitable sources of low and high air pressure and to liquid flux. The arrangement is such that a solenoid valve 128 (FIG. 12) controlling admission of the high pressure air to actuate an operating trigger of the gun is automatically operated by passage of the carriage 42 through the station. Thus, the cam 82 engages a lever 130 (FIGS. 9 and 10) pivoted at 132 momentarily to close a contact M2 against the resistance of a return spring 134. A contact M1 (FIGS. 8, 9, and 12) is also closed when a control lever 136 (FIGS. 8, 9, and 11) normally extending into the path of the wiring board is thereby deflected downwardly about its fulcrum at 138 against resistance of a return spring 140. The gun is adjustable heightwise on a post 142 by means of a clamping arm 144 mounted on the post, and an arm 146 carrying the gun is adjustable widthwise in the arm 144 to enable the spray to be played, in an oval pattern as indicated at 148 in FIG. 10, over the required portion of the opening 120. Contacts M1 and M2 are accordingly closed as the leading edge of the wiring board is just within the pattern 148 and hence a solenoid K1 (FIG. 12) is energized whereby contacts K1–A and K1–B are closed. Contact K1–A serves to maintain the solenoid K1 energized after M2 opens. The valve 128 is consequently caused to trigger the gun, the low pressure air and the flux being admitted and sprayed evenly over the entire undersurface of the wiring board. Since it is important that every portion of the undersurface receive the same quantity and evenness of spray, time delay mechanism T.D.O. of conventional character is associated with the contact K1–B to insure that the latter will remain closed for the further time interval required for the trailing edge of the wiring board to proceed from the lever 136 to a position (indicated by dot-dash lines in FIGS. 10 and 11) wherein said trailing edge is about to emerge from the pattern 148. The time delay having run out, K1–B opens to shut off the spray, and the treated wiring board proceeds to the pre-heating station.

*Pre-heating station*

Figures 13, 14:
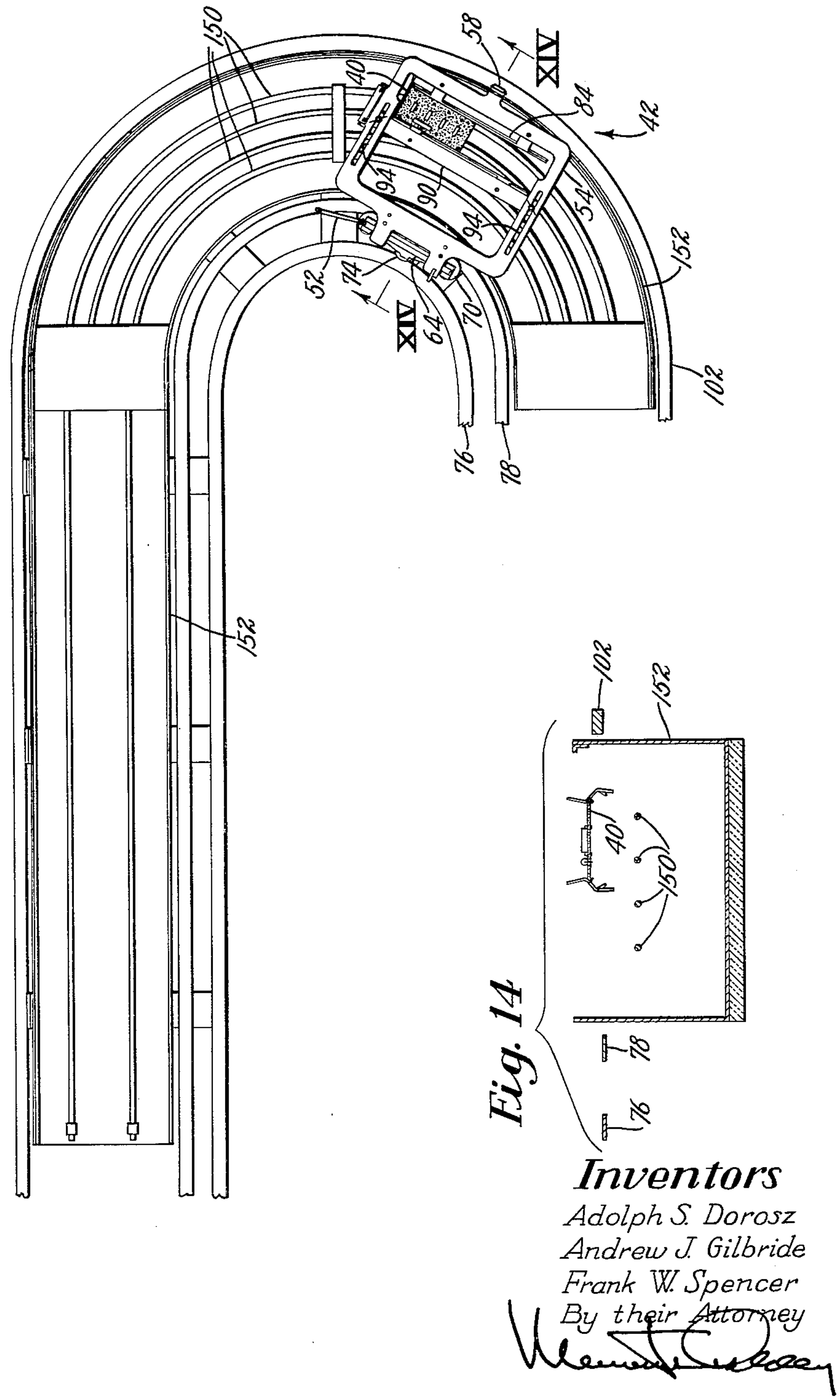
FIG. 13 is a plan view of a pre-heating station.
FIG. 14 is a section taken on the line XIV—XIV of FIG. 13.

FIGS. 13 and 14 show the carriage 42 and its tracks 76, 78, and 102, the latter being semicircular at this station while guiding the wiring board over four thermostatically controlled, semicircular heating units 150. These units may be of quartz type and be connected electrically with the conveyor drive means in a manner such that if for any reason the carriages must be stopped the heating units will quickly be cooled. An insulated housing 152 mounted on the frame 104 encloses the heating units so that upon traveling over their length the wiring boards are uniformly heated and their flux coating is uniformly conditioned in preparation for dip soldering. It will be noted that only two of the heating units need extend all the way to the dip soldering station, the four units being utilized at first quickly to bring the boards up to the desired temperature, to drive off solvent, and, if appropriate, to activate the flux. In order to reduce the rate of travel of each carriage while traversing the four heating units without altering the speed of the chain 44, the circular path of the chain is not concentric with that of the carriage, as shown in FIG. 1, but is moved relatively outward. Accordingly, in this portion of the machine the upper end of a tow link 52 moves at the regular speed of the chain 44, but the lower end of the link moves over a shorter path in the same time interval, and hence tows its carriage at a relatively slower speed to make more efficient use of the heated space.

*Dip soldering station*

Referring to FIG. 15, after towing the carriage 42 through the pre-heating station, the chain 44 passes over a pair of the idler sprockets 108 (FIGS. 1 and 15) to tow the carriage 42 over an insulated tank 158 (FIGS. 15, 18, and 26) bolted to the frame 104 and adapted to contain liquid solder 160. The main portion of this tank is provided with three thermostatically controlled, U-shaped heating units 162, 164, 166, and an adjacent replenishment chamber 168 is provided with a thermostatically controlled, single U-shaped heating unit 170 (FIGS. 22 and 24). A pair of cross bars 172 (one shown in FIG. 20) is fitted into internal shoulders of the tank to anchor the heating units at the bottom of the solder tank. The solder level in the tank is controlled by means to be explained, and, as indicated in FIGS. 15, 25, and 28, the tracks 76, 78, and 102 descend to permit the wiring board to be moved at first downwardly in an inclined path, and then, while partially immersed, parallel to the surface of the solder 160, the leading edge of the board entering the molten solder first, and the remainder of the undersurface of the board gradually entering and assuming parallelism with the solder surface, thereby preventing undue disturbance of the solder surface and avoiding entrapment of air beneath a board which might impair the quality of the soldering. Before the leading edge of the board enters the solder, a cylindrical end portion 175 of the wiper blade 98 is engaged by a fixed cam 173 (FIGS. 20 and 27) to insure that the blade descends and acts as shown in FIG. 26 to clear the solder surface about to be traversed by the board, dross 174 (FIG. 29) being accumulated at the far end of the tank and then removed by the wiper as the carriage tracks rise to guide the board from the tank. To avoid excessive disturbance of the solder surface as the wiper enters it and advances, the cylindrical end portions 175 of the wiper ride on rails associated with the tank.

The temperature of the solder and its composition are important factors in obtaining well soldered joints, and the duration of each dip and especially the rate and manner of removal of each board from the solder surface are important considerations. In order to slow down the carriage somewhat to a selected speed without altering the speed of the chain 44, their paths are caused to be diverted or changed from a parallel relation to an angular one, as best shown in FIGS. 1 and 20. Thus, by now giving the upper end of the tow link 52 a widthwise movement, as well as a longitudinal one, while its lower end is constrained only to longitudinal movement, the carriage is moved more slowly relatively to the speed of the chain, and more effective use may be made of the length of the tank. It will be apparent that the angularity of the path of the chain may be modified with respect to the path of the carriage by shifting a sprocket 108 to obtain the optimum carriage speed over the tank. The reversal of direction and greater angularity of the chain 44 (FIG. 20) as the carriage emerges from the tank serves to lessen the carriage speed somewhat further in the critical portion of its travel. The carriage tracks (FIGS. 25 and 29) are preferably inclined upwardly from the solder surface adjacent to the exit end of the tank 158 and thus adapted to cause the undersurface of the wiring boards to break surface tension with the solder progressively from the leading edge to the trailing edge of the board. Menisci accordingly move relatively to a wiring board as schematically shown in FIGS. 16 and 17.

For replenishing the tank with solder to maintain its solder surface level, a vertical rack 180 (FIGS. 15, 22, and 24) for holding a stack of solder bars 182 is mounted on the tank adjacent to, but offset from, an opening 184 in the chamber 168. Secured to the side of the frame 104 is a cast bracket 187 to which is attached a flat shelf 186 on which a U-shaped guide 188 is screwed to determine the path of a T-shaped reciprocable plunger 190. The latter has a bevelled edge face 192 arranged to project into the rack 180 to engage a side of the bottommost bar 182 and thrust it into the chamber 168 for melting. For operating the plunger 190 it is connected by a yieldable composite link 194 to a pin 196 projecting eccentrically from a hub 198 that is rotatably driven by a motor 200 (FIG. 22) and suitable reduction gearing not shown. In order to actuate the motor 200 upon a lowering of the solder surface in the tank by a predetermined amount from its normal level, i.e., to insure that the solder level will be maintained within permissible limits in relation to the heightwise position of the boards as determined by the tracks 76, 78, and 102 when over the tank, level indicating means such as a float 202 (FIGS. 20–22) is disposed in a well 204 communicating with the tank and accordingly rises or falls with the solder level of the tank. A plug 206 (FIG. 23) centered in the float is threaded adjustably to receive an upright screw 208 having a collar 210 and a head between which an end of a switch-carrying lever 212 is free to move heightwise, the lever being pivoted at 214 on a cover 216 of the well. This cover is suitably bored to avoid interference with movement of the plug 206. Secured on the lever 212 in a generally horizontal position is a conventional type of control switch comprised of a cylindrical bulb 218 containing a blob of mercury 220 and having at one end a pair of spaced terminals 222, 222 arranged to be electrically connected by the mercury when the lever is moved counterclockwise as viewed in FIG. 23. Thus, the construction is such that as the solder surface in the tank is lowered, the head of the screw 208 descends to tilt the lever 212 and effect connection of the terminals whereby a circuit connected to the motor 200 is energized and the plunger 190 is thereby caused to reciprocate and plunge one after another of the lowermost bars 182 into the chamber 168. Melted solder in the chamber 168 is consequently displaced and enters the tank via an opening 224 (FIG. 24) in a separating wall which serves as a baffle to prevent disturbance in the tank. As the tank solder level is thus raised, the collar 210 engages the lever 212 to return it clockwise as viewed in FIG. 21 until, at the proper moment, the mercury leaves the terminals 222 to open the motor control circuit and stop feeding movements of the plunger 190. When thus restored to its appropriate level the solder surface is substantially in the heightwise relation to a wiring board being dip soldered shown by dot-dash line in FIG. 21, and this view likewise indicates the type of smooth and fairly thin soldered joint which is being produced, S indicating the solder, L the component lead, and PC the printed circuit.

Emersion of the wiring board from the solder at an improper speed or at an improper inclination may result in excessive solder clinging to the leads and printed circuit to form an undesirably rough or "spiked" coating. With certain work pieces and under certain operating conditions it is satisfactory to separate the work from the liquid solder by elevating the work after first raising its leading edge and progressing upwardly on an incline as shown in FIG. 29, this procedure being the reverse of the immersion previously described. With other work pieces and other operating conditions it may prove desirable to elevate the work as it progresses, but while maintaining its undersurface in parallel relation to the solder surface. For this latter purpose a track 226 (FIGS. 18 and 19) may be mounted on a portion of the track 76 for cooperation with the carriage arm 80. In this manner the latter is raised relatively to what would be its normal position causing the carriage frame 54 and its rod 64 to be pivoted clockwise, as viewed in FIG. 18, about the pin 66 to maintain the horizontal position of the carriage frame 54, while the dolly is guided upwardly on an incline.

To the exit end of the tank a box 230 having a handle 232 is detachably secured and provided with a wave-shaped cam 234 adapted to be engaged by the wiper blade 98. Thus, the excess dross in the tank is scraped over the end of the tank and into the box, and dross clinging to the blade as it is caused to be vibrated or shaken also falls into the box.

The combination of effective pre-heating of the wiring board, together with retention and increase of the heat transferred to the board by its motion relatively to the molten solder to eliminate so-called "solder freezing" in the tank, plus the effective removal by the blade 98 of dross, assures uniformly good soldered joints with no bridging between wiring board conductors; each board passes only through a wiper swept area of the solder, and there is very little time between successive sweeps for oxidation of the solder to occur.

*Cleaning bath*

It will be understood that for some fluxes and work pieces it may be possible to eliminate this station, or the next one to be described, from the full series of operations, though it is considered that their inclusion normally assures a better quality product. Referring to FIGS. 30 and 31, in order to enable the soldered wiring board next to be introduced into an arcuate tank 240 containing a suitable cleaning fluid 242, for example, a solvent bath such as a perchlorethylene solution, effective to remove the flux being employed, the carriage frame 54 is tilted about the rod 64 as an axis by means of the roller 58 passing over a raised portion 244 (FIG. 31) of the track 102. When the frame 54 is permitted to resume its substantially horizontal position, its wiring board is immersed in the bath and progresses, as shown in FIGS. 30 and 32, over an arcuate path. A series of rectangular bases 246 is disposed in the tank 240, each having a pair of grooves arranged in widthwise V-formation for receiving, respectively, the back of a fairly stiff type of bristle brush 248. The upper ends of the bristles extend substantially to the surface of the bath to engage and scour the entire undersurface of each passing board and also its wiper blade 98. In order to adjust the effective height of the brushes, and thus obtain long wear therefrom, as well as maintain a consistently uniform and rather rigorous cleaning action on the boards, each base 246 threadedly receives in its inner and outer margins vertical set screws 250 which project to engage the bottom of the tank 240. Since most wear on the brushes will normally be encountered on their outer extermities, it becomes a simple matter occasionally to raise these portions of the brushes by turning the screws along the outer margin to cause them to project more from the bases as required. At this station, as in the case of the pre-heating station, the path of the chain 44 is not concentric with that of the carriages but is relatively outward therefrom, as indicated schematically in FIG. 1, the carriages thus again being slowed temporarily to afford ample opportunity for the solvent to act.

*Draining and air cleaning*

By means of a raised portion 252 (FIGS. 35 and 36) of the track 102 the successive carriages 42 are again tilted about their rods 64 as axes, the wiring boards being raised from the cleaning tank and then guided into an open end enclosure 254 (partly shown in FIG. 36) in an inclined path extending between the discharge patterns of two pairs of tubes 256. Beneath the track portion 252 and mounted between the bars 112, 114 is an elongated V-bottomed container 258 for catching cleaning fluid as it drains from the carriages and their work pieces. A strainer 260 in the container serves to retain particles of loosened metal and other extraneous matter so that the recaptured liquid may be drained off periodically through a cock 262 (FIG. 35) for reuse or other disposition. At the height of the portion 252, when probably only droplets continue to cling by surface tension to a tilted board, the cam 82 of its carriage is disposed to actuate means for causing a stream of air, heated if necessary, to be blown through the tubes 256 to effect removal of the remaining moisture on the wiring board and its components. The arrangement preferably is such that as the leading edge of a wiring board is about to approach into the discharge zone of the tube, the cam 82 engages and rides along a switch-operating lever 264 (FIGS. 33, 36, and 37), the lever being thus displaced counterclockwise, as viewed in FIG. 36, about its pivot 266 which is journaled in a bracket 268 secured to the bar 114. A contact carrying arm 270 of the lever is accordingly caused, against the resistance of a return spring 272, to actuate a switch 274 and thus close a circuit which is effective to operate a valve 276 admitting air under pressure to the tubes 256. When the cam 82 leaves the lever 264 the trailing edge of the wiring board is about to leave the air discharge zone, and the valve 276 is then allowed to shut off the air flow.

*Unloading station*

Figures 5, 6:
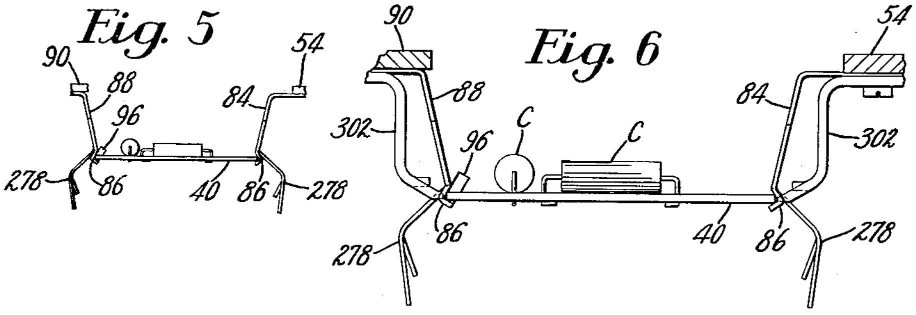
FIG. 5 is a detail view of parts shown in FIG. 4 and indicating the manner in which a wiring board is yieldingly held by spring fingers.
FIG. 6 is a view corresponding with FIG. 5 and enlarged to show a board stripping or unsticking device.

As the carriage 42 enters the unloading station (FIGS. 38 and 40) the tracks 76, 78, and 102 resume horizontal positions to guide oppositely disposed pairs of lower end portions 278, 278 (FIGS. 11, 40) of the board-carrying arms 84, 88 progressively into cooperative engagement with inturned ends 280, 280 (FIG. 39) of a pair of deflector arms 290, 290, respectively. The latter are adjustably mounted at their other ends on a bracket 292 spanning the bars 112, 114, clamping bolts 294 respectively extending through a widthwise slot in the bracket and extending into threaded bores formed in the arms 290. The ends 280 act as cams to spread apart the oppositely disposed portions 278 and thus permit the wiring board to be released for deposit into a chute 296 (FIG. 38) mounted on the frame 104. Each wiring board may then be conducted to a suitable receptacle 300 (FIG. 38) while the unloaded carriage 42 continues without pause to the loading station to repeat another cycle of operation. As indicated in FIG. 6, if there is a tendency for a work piece to adhere to the fingers 86, a pair of stripping devices in the form of relatively stiff arms 302 may be secured to the frame 54 and the crossbar 90 and have lower ends projecting nearly to engage a work piece edge. Then, when the fingers 86 are spread, the work piece would be carried edgewise against these lower ends of one of the arms 302 acting as a stop and the fingers 86 would be further deflected to effect release.

From the foregoing it will be appreciated that the invention provides an automatic machine capable of high output and with a minimum of manual superintendence, the organization further being versatile in that a wide range of operating requirements may be successfully and safely met.

Having thus described our invention, what we claim as new and desire to secure by Letters Patent of the United States is:

1. In apparatus for dip soldering printed wiring boards, a series of work treating stations including one wherein each board is partly immersed to enable its circuitry to be soldered, said stations being arranged in a closed path and having track means extending adjacent thereto, a plurality of board-supporting carriages guided for movement by said track means to position the boards heightwise and angularly at the successive stations and directly above the solder at said soldering station, a generally horizontal, endless chain mounted for continuous movement above said track means and coupled to the carriages to move them in succession through the series of stations, a pair of rotary sprockets coupled with the chain primarily to determine its path, and at least two idler sprockets adjustably spaced transversely of the exit end of the soldering station for causing the path of the chain angularly to deviate from that of the carriages whereby their speed and that of their wiring boards is modified as they emerge from the soldering station.

2. In apparatus for dip treating work pieces and including an elongated liquid-containing tank wherein the work pieces are to be successively immersed, a track extending above the tank and lengthwise thereof, work supporting carriages adapted to be guided by the track in succession to position a lower surface of each work piece in moving contact with the liquid in the tank and then be removed therefrom at its exit end, flexible endless drive means operable at substantially constant speed and coupled to the carriages for moving them in one direction over the length of the tank, and at least two wheel-like members respectively arranged above the tank to engage the drive means, adjacent ones of said members being spaced differently transversely of the tank for cooperating with opposite sides of the drive means to cause its path to deviate from that of the direction of the carriages whereby the speed of the latter is reduced from that of the drive means while traversing the liquid in the tank.

References Cited in the file of this patent

UNITED STATES PATENTS

| | | |
|---|---|---|
| 301,579 | Edwards | July 8, 1884 |
| 306,494 | Jordan | Oct. 14, 1884 |
| 975,731 | Smyth | Nov. 15, 1910 |
| 1,052,737 | McColl | Feb. 11, 1913 |
| 1,193,425 | Robinson et al. | Aug. 1, 1916 |
| 1,365,291 | Stephens et al. | Jan. 11, 1921 |
| 1,725,960 | Jones | Aug. 27, 1929 |
| 1,753,639 | Badgley | Apr. 8, 1930 |
| 1,860,048 | Myers | May 24, 1932 |
| 1,947,689 | Young | Feb. 20, 1934 |
| 2,036,501 | Rhead et al. | Apr. 7, 1936 |
| 2,279,691 | Long et al. | Apr. 14, 1942 |
| 2,515,097 | Schryber | July 11, 1950 |
| 2,534,054 | Parkes | Dec. 12, 1950 |
| 2,575,412 | Fechter | Nov. 20, 1951 |
| 2,634,697 | Nofzinger | Apr. 14, 1953 |
| 2,646,620 | Geddes et al. | July 28, 1953 |
| 2,685,268 | Yeo et al. | Aug. 3, 1954 |
| 2,716,478 | Wehmiller et al. | Aug. 30, 1955 |
| 2,740,193 | Pessel | Apr. 3, 1956 |
| 2,765,761 | Truran | Oct. 9, 1956 |
| 2,770,875 | Zimmerman | Nov. 20, 1956 |
| 2,771,852 | Iles | Nov. 27, 1956 |